(12) United States Patent
Chiang et al.

(10) Patent No.: US 11,393,644 B2
(45) Date of Patent: Jul. 19, 2022

(54) INPUT DEVICE

(71) Applicants: LITE-ON ELECTRONICS (GUANGZHOU) LIMITED, Guangzhou (CN); Lite-On Technology Corporation, Taipei (TW)

(72) Inventors: Hsiao-Lung Chiang, Taipei (TW); Chih-Wen Su, Taipei (TW); Yu-Hsun Chen, Taipei (TW); Chin-Yuan Lin, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/794,108

(22) Filed: Feb. 18, 2020

(65) Prior Publication Data

US 2020/0272248 A1 Aug. 27, 2020

Related U.S. Application Data

(60) Provisional application No. 62/808,818, filed on Feb. 21, 2019.

(30) Foreign Application Priority Data

Jan. 6, 2020 (CN) .......................... 202010008614.X

(51) Int. Cl.
*H01H 13/14* (2006.01)
*G06F 1/16* (2006.01)
(Continued)

(52) U.S. Cl.
CPC .............. *H01H 13/14* (2013.01); *G05G 1/10* (2013.01); *G06F 1/169* (2013.01); *G06F 1/1664* (2013.01);
(Continued)

(58) Field of Classification Search
CPC ...... H01H 13/14; H01H 3/125; H01H 13/705; H01H 13/83; H01H 2217/01; H01H 2219/03; H01H 2219/036; H01H 2221/07; G05G 1/10; G06F 1/1664; G06F 1/169; G06F 3/03543; G06F 3/0362; G06F 3/041; G06F 1/1616; G06F 2203/04103;
(Continued)

(56) References Cited

U.S. PATENT DOCUMENTS

| | | | |
|---|---|---|---|
| 6,344,643 B1 * | 2/2002 | Chen ...................... | G06F 3/0312 250/221 |
| 2011/0227828 A1 * | 9/2011 | Blandin .............. | G06F 3/03543 345/163 |
| 2020/0133326 A1 * | 4/2020 | Su ......................... | G06F 3/0362 |

* cited by examiner

*Primary Examiner* — Amare Mengistu
*Assistant Examiner* — Gloryvid Figueroa-Gibson
(74) *Attorney, Agent, or Firm* — JCIPRNET

(57) ABSTRACT

The invention provides an input device including a holder, a first wheel, a slider, and a first pressure part. The first wheel is disposed on the holder, and includes a side surface, a circle center, and a segment adjusting structure. The segment adjusting structure is disposed on the side surface in a manner of surrounding the circle center. The slider is disposed on the holder, and is movable relative to the holder to move toward or away from the circle center. The first pressure part includes two first ends. One of the first ends is connected to the slider, and as the slider moves toward or away from the circle center, interference between the other first end and the segment adjusting structure is increased or reduced.

14 Claims, 12 Drawing Sheets

(51) Int. Cl.
*H01H 3/12* (2006.01)
*H01H 13/705* (2006.01)
*H01H 13/83* (2006.01)
*G06F 3/041* (2006.01)
*G05G 1/10* (2006.01)
*G06F 3/0354* (2013.01)
*G06F 3/0362* (2013.01)

(52) U.S. Cl.
CPC ........ *G06F 3/0362* (2013.01); *G06F 3/03543* (2013.01); *G06F 3/041* (2013.01); *H01H 3/125* (2013.01); *H01H 13/705* (2013.01); *H01H 13/83* (2013.01); *G06F 1/1616* (2013.01); *G06F 2203/04103* (2013.01); *H01H 2217/01* (2013.01); *H01H 2219/03* (2013.01); *H01H 2219/036* (2013.01); *H01H 2221/07* (2013.01)

(58) Field of Classification Search
CPC ............. G06F 3/03541; G06F 3/03544; G06F 3/03549; G06F 3/0395
USPC ....................................................... 345/163
See application file for complete search history.

INPUT DEVICE

CROSS-REFERENCE TO RELATED APPLICATION

This application claims the priority benefits of U.S. provisional application Ser. No. 62/808,818, filed on Feb. 21, 2019, and China application serial no. 202010008614.X, filed on Jan. 6, 2020. The entirety of each of the above-mentioned patent applications is hereby incorporated by reference herein and made a part of this specification.

BACKGROUND

Technical Field

The disclosure relates to an input device capable of adjusting a sense of segmented movement during use.

Description of Related Art

With the development of science and technology, a computer becomes an indispensable electronic product used at work or home. In peripherals of the computer, an input device, such as a mouse, can make it easy for a user to slide a pointer and input an instruction.

However, different users have different habits of use. The sense of segmented movement provided by the wheel of a currently common input device comes from an electronic component encoder or is generated by using a mechanism. Generally, only a one-segment sense is provided, and the sense cannot be adjusted.

SUMMARY

The invention relates to an input device capable of adjusting a sense of segmented movement during use.

According to embodiments of the invention, the input device includes a holder, a first wheel, a slider, and a first pressure part. The first wheel is disposed on the holder, and includes a side surface, a circle center, and a segment adjusting structure. The segment adjusting structure is disposed on the side surface in a manner of surrounding the circle center. The slider is disposed on the holder, and is movable relative to the holder to move toward or away from the circle center. The first pressure part includes two first ends. One of the first ends is connected to the slider, and as the slider moves toward or away from the circle center, interference between the other of the first ends and the segment adjusting structure is increased or reduced.

Based on the above, because in the invention, the slider, the first pressure part, and the segment adjusting structure are disposed in the input device, a degree of interference between the first pressure part and the segment adjusting structure can be adjusted by moving the slider, thereby adjusting a scroll speed of the first wheel to meet a requirement of a user.

BRIEF DESCRIPTION OF THE DRAWINGS

The accompanying drawings are included to provide a further understanding of the invention, and are incorporated in and constitute a part of this specification. The accompanying drawings illustrate embodiments of the invention and, together with the description, serve to explain the principles of the invention.

DESCRIPTION OF THE EMBODIMENTS

Figure 1A:
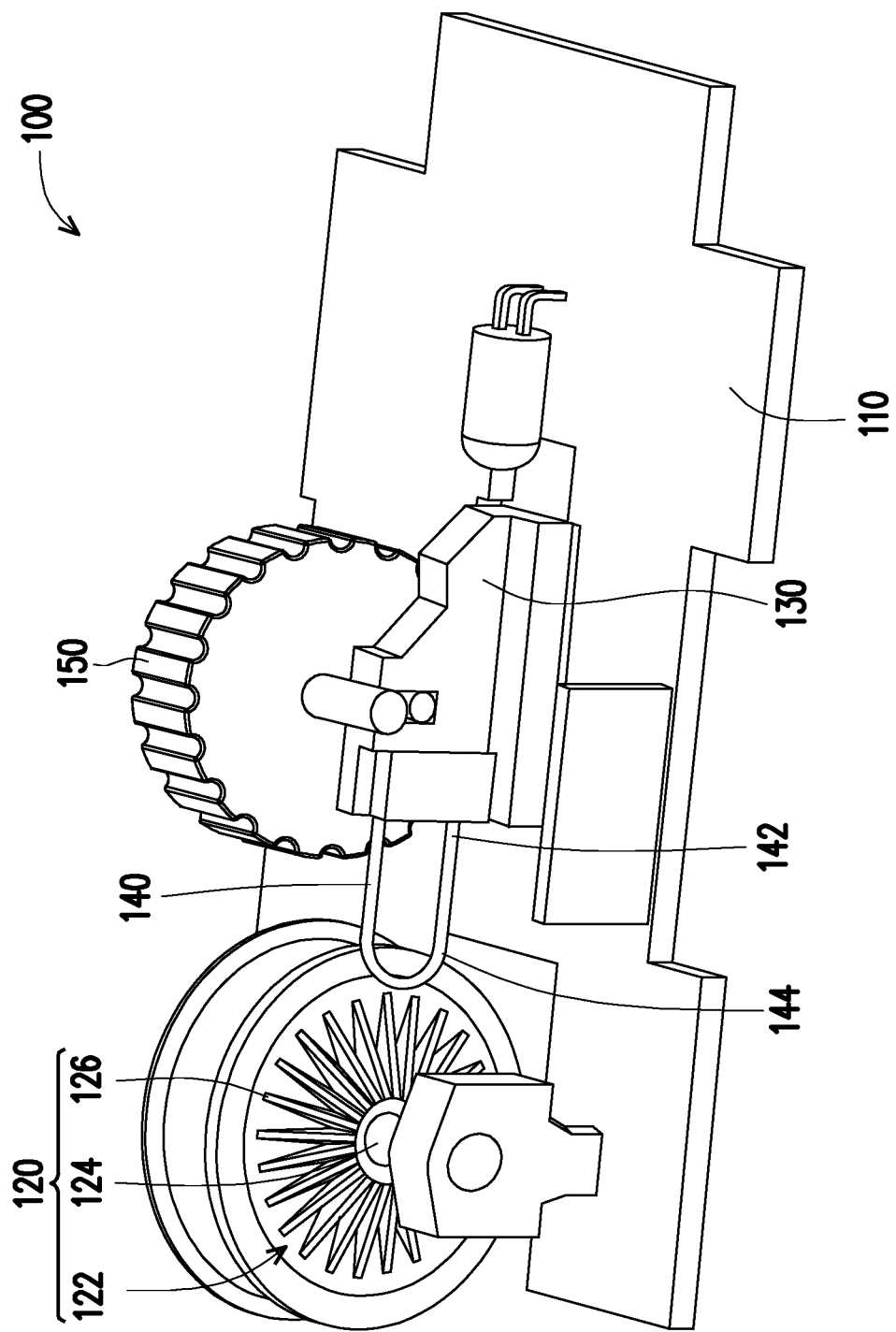
FIG. 1A and FIG. 1B are schematic three-dimensional diagrams of an input device 100 according to Embodiment 1 of the invention.

Based on the above, the invention provides an input device, including a holder, a first wheel, a slider, and a first pressure part. The first wheel includes a side surface, a circle center, and a segment adjusting structure. The segment adjusting structure is disposed on the side surface in a manner of surrounding the circle center. The slider is disposed on the holder, and is movable relative to the holder to move toward or away from the circle center. The first pressure part includes two first ends. One of the first ends is connected to the slider, and as the slider moves toward or away from the circle center, interference between the other first end and the segment adjusting structure is increased or reduced.

Based on the above, when a user uses the input device, a force that needs to be applied to the first wheel to scroll the first wheel may be adjusted according to a habit of the user by changing a degree of interference between the first pressure part and the segment adjusting structure, and a scroll speed of the first wheel can also be adjusted. Some embodiments are provided as follows. The foregoing effects can be achieved by selecting different structures and combinations of components.

Referring to exemplary embodiments of the invention in detail, examples of the exemplary embodiments are described in the accompanying drawings. If possible, the same component symbols in the drawings and descriptions represent same or similar parts. In addition, for ease of description, a housing and a base of the input device are omitted in the drawings related to the following description.

Embodiment 1

Figure 1B:
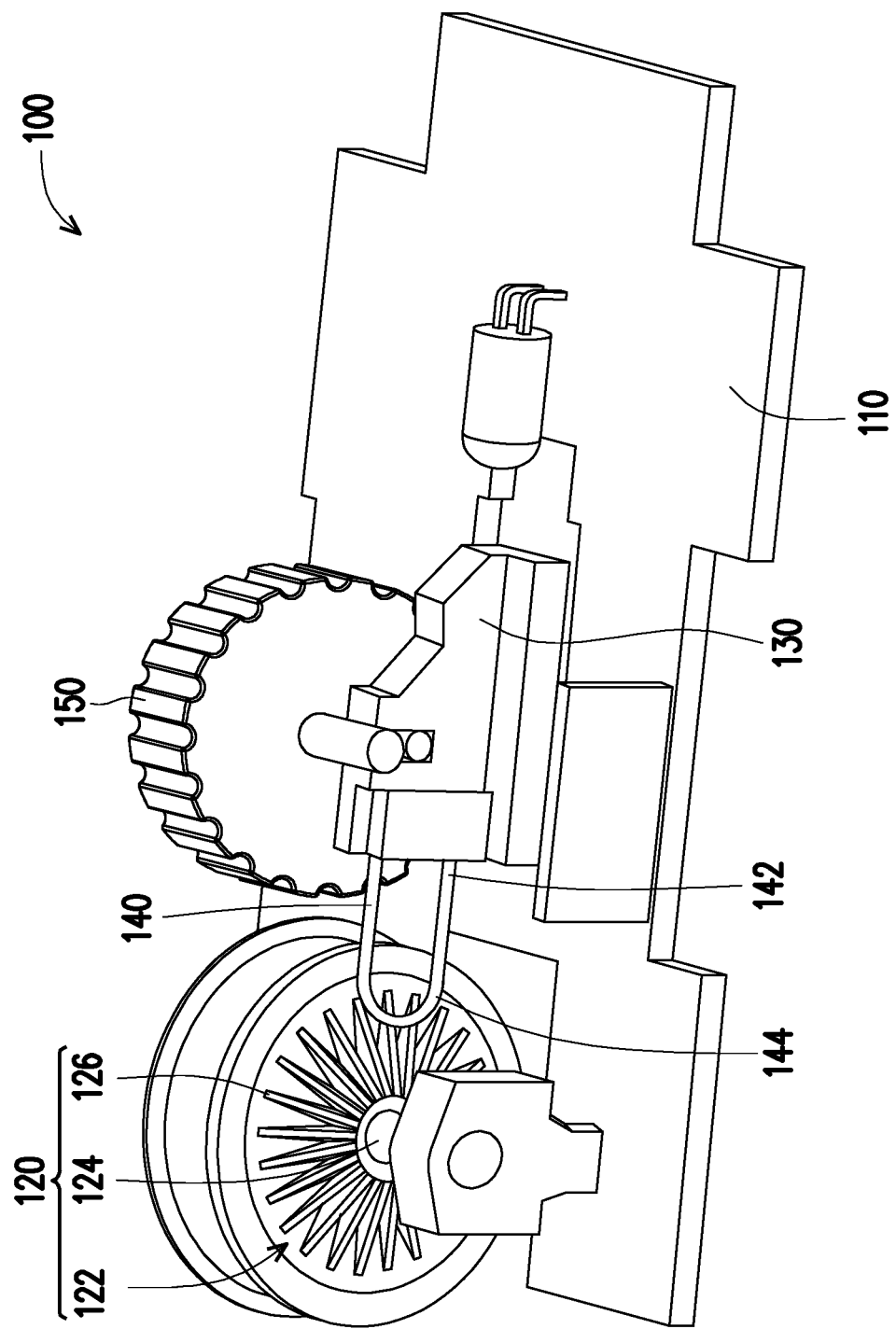

FIG. 1A and FIG. 1B are schematic three-dimensional diagrams of an input device 100 according to Embodiment 1 of the invention. FIG. 1A and FIG. 1B show different states of the input device 100. Referring to FIG. 1A and FIG. 1B together, the input device 100 in the present embodiment includes a holder 110, a first wheel 120, a slider 130, and a first pressure part 140.

The holder 110 is secured on a base (not shown) of the input device 100. The first wheel 120 is secured on the holder 110, and includes a side surface 122, a circle center 124, and a segment adjusting structure 126. The segment adjusting structure 126 is disposed on the side surface 122 in a manner of surrounding the circle center 124, that is, the segment adjusting structure 126 is radially disposed on the side surface 122 by centering in the circle center 124. The segment adjusting structure 126 has a shape feature that a thickness increases from an edge of the first wheel 120 toward the circle center 124. In other words, in a radial direction of the first wheel 120 (that is, a direction from a periphery of the first wheel 120 toward the circle center 124), a cross section of the segment adjusting structure 126 is substantially a right-angled triangle.

The slider 130 is disposed on the holder 110, and is movable relative to the holder 110 to move toward or away from the circle center 124 of the first wheel 120.

The first pressure part 140 includes two first ends 142 and 144. One of the first ends 142 is secured on the slider 130, so that the first pressure part 140 may move toward or away from the circle center 124 as the slider 130 moves. Interference between the other first end 144 and the segment adjusting structure 126 is increased or reduced as the slider 130 moves, or even there is no contact between the other first end 144 and the segment adjusting structure 126. In the present embodiment, the first pressure part 140 is a spring plate made of a metal.

The input device 100 further includes a knob 150 connected to the slider 130, and the knob 150 in the present embodiment may be a second wheel. For the second wheel, it should be noted that there is a convex column below a circle center of the knob 150. The convex column is engaged in a groove of the slider 130. Therefore, when turned, the second wheel may drive the slider 130 to move. That is, when a user turns the second wheel counterclockwise, the second wheel may drive the slider 130 to move away from the first wheel 120, so that the interference between the first end 144 of the first pressure part 140 and the segment adjusting structure 126 may be reduced or eliminated. When the user turns the second wheel clockwise, the second wheel may drive the slider 130 to move toward the first wheel 120, so that the interference between the first end 144 of the first pressure part 140 and the segment adjusting structure 126 may be increased.

In the input device 100, both the first wheel 120 and the second wheel both protrude from a housing (not shown) of the input device 100, so that the user may turn the first wheel 120 and the second wheel with fingers.

When operating the input device 100, the user turns the first wheel 120 with fingers to adjust a page of a document. When a scroll speed of the first wheel 120 does not meet an expectation of the user, for example, the first wheel 120 can be scrolled only when a relatively large force is applied, or the scroll speed of the first wheel 120 is higher than an expected speed, the user may adjust the scroll speed to a desired scroll speed of the first wheel 120 by changing a degree of interference between the first pressure part 140 and the segment adjusting structure 126.

Specifically, the user turns the second wheel that is used as the knob 150 to enable the slider 130 moves toward or away from the first wheel 120, so as to further changing the degree of interference between the first pressure part 140 and the segment adjusting structure 126. Therefore, the scroll speed of the first wheel 120 may be changed.

In a first case, the second wheel is farther from the first wheel 120, and the first pressure part 140 is not in contact with the segment adjusting structure 126. In this case, the first pressure part 140 does not apply a force to the first wheel 120, so that the first wheel 120 may quickly scroll without hindrance.

If the user believes that the input device 100 in the first case does not meet a use expectation, the input device 100 may be changed to a second case. Specifically, the user turns the second wheel, and drives the slider 130 to move toward the circle center 124 of the first wheel 120 relative to the holder 110. As the slider 130 moves, the first pressure part 140 is driven to get in contact with the segment adjusting structure 126. After the first pressure part 140 starts to get in contact with the segment adjusting structure 126, the first pressure part 140 may apply pressure to the first wheel 120. Therefore, scrolling of the first wheel 120 may be affected by the force that is applied by the first pressure part 140 to the first wheel 120, so that the user needs to apply a larger force to the first wheel 120.

In particular, a thickness of the segment adjusting structure 126 increases from the edge of the first wheel 120 toward the circle center 124. Therefore, as the slider 130 gets closer to the circle center 124 of the first wheel 120, the degree of interference of the first end 144 of the first pressure part 140 that is closer to the circle center 124 on the segment adjusting structure 126 is larger, and a force that is applied by the first pressure part 140 to the first wheel 120 is larger, so that the user needs a larger force to scroll the first wheel 120.

On the contrary, when the first end 144 of the first pressure part 140 that is closer to the circle center 124 moves away from the circle center 124, a force that is applied by the first pressure part 140 to the first wheel 120 becomes smaller, so that the user needs a smaller force to the scroll the first wheel 120, and the scroll speed of the first wheel 120 becomes faster.

By the way, the segment adjusting structure 126 in the present embodiment is a discontinuous structure spaced apart at an interval in a circumferential direction. In this way, when the user scrolls the first wheel 120 with fingers, the first pressure part 140 gets in contact with each segment adjusting structure 126, which may feed back to the user a segmented sense. In other implementations, the segment adjusting structure 126 may alternatively be designed as a continuous surface. When the user scrolls the first wheel 120, the sense that is fed back may be provided by other mechanical components, or the sense may not be fed back to the user.

In addition, in other implementations, the knob 150 may alternatively be a button that is integrated with the slider 130 and that protrudes from the housing (not shown) of the input device 100. Therefore, the user may linearly push the knob 150 to move the slider 130.

Embodiment 2

Figure 2A:
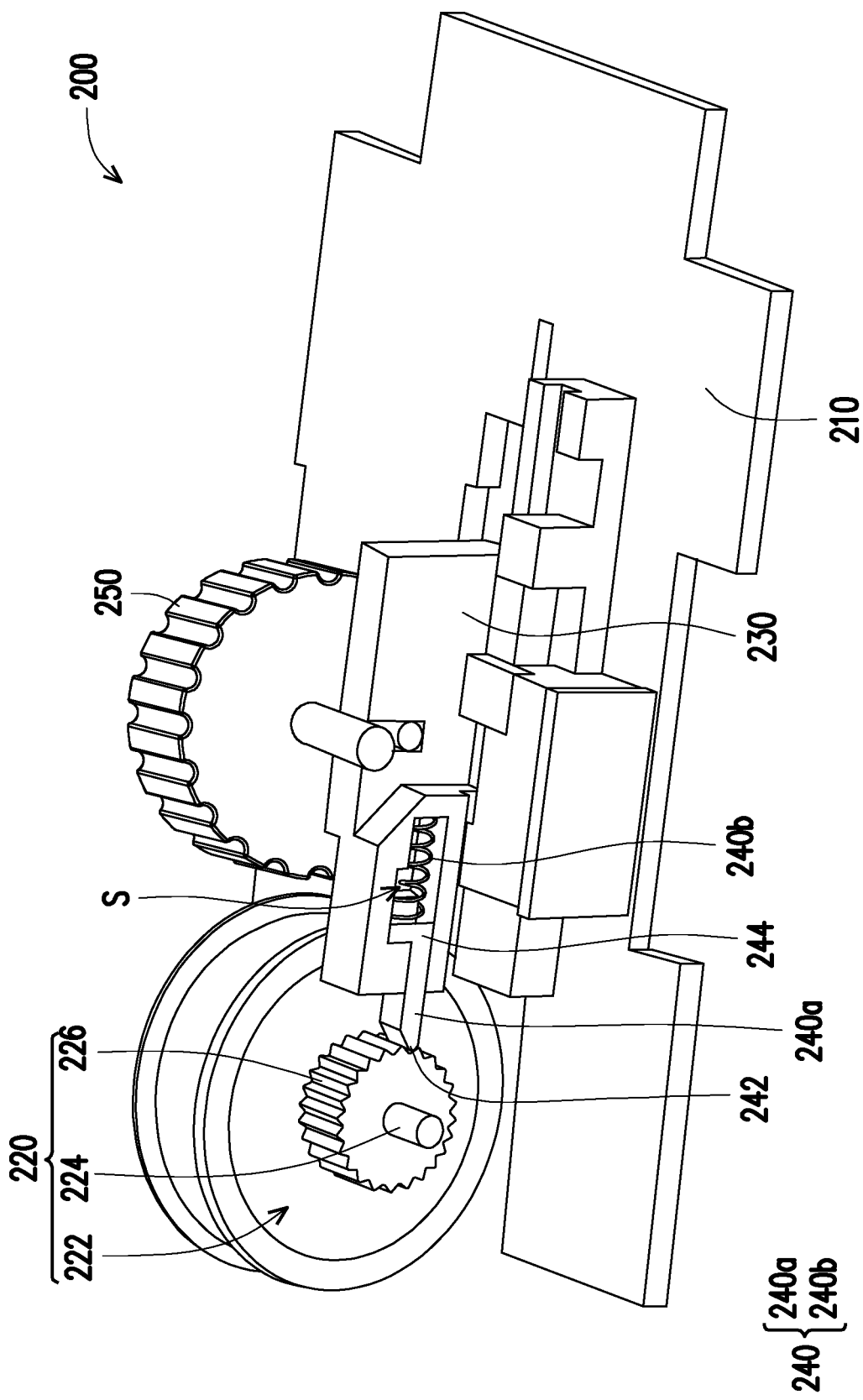
FIG. 2A is a schematic three-dimensional diagram of an input device 200 according to Embodiment 2 of the invention.
Figure 2B:
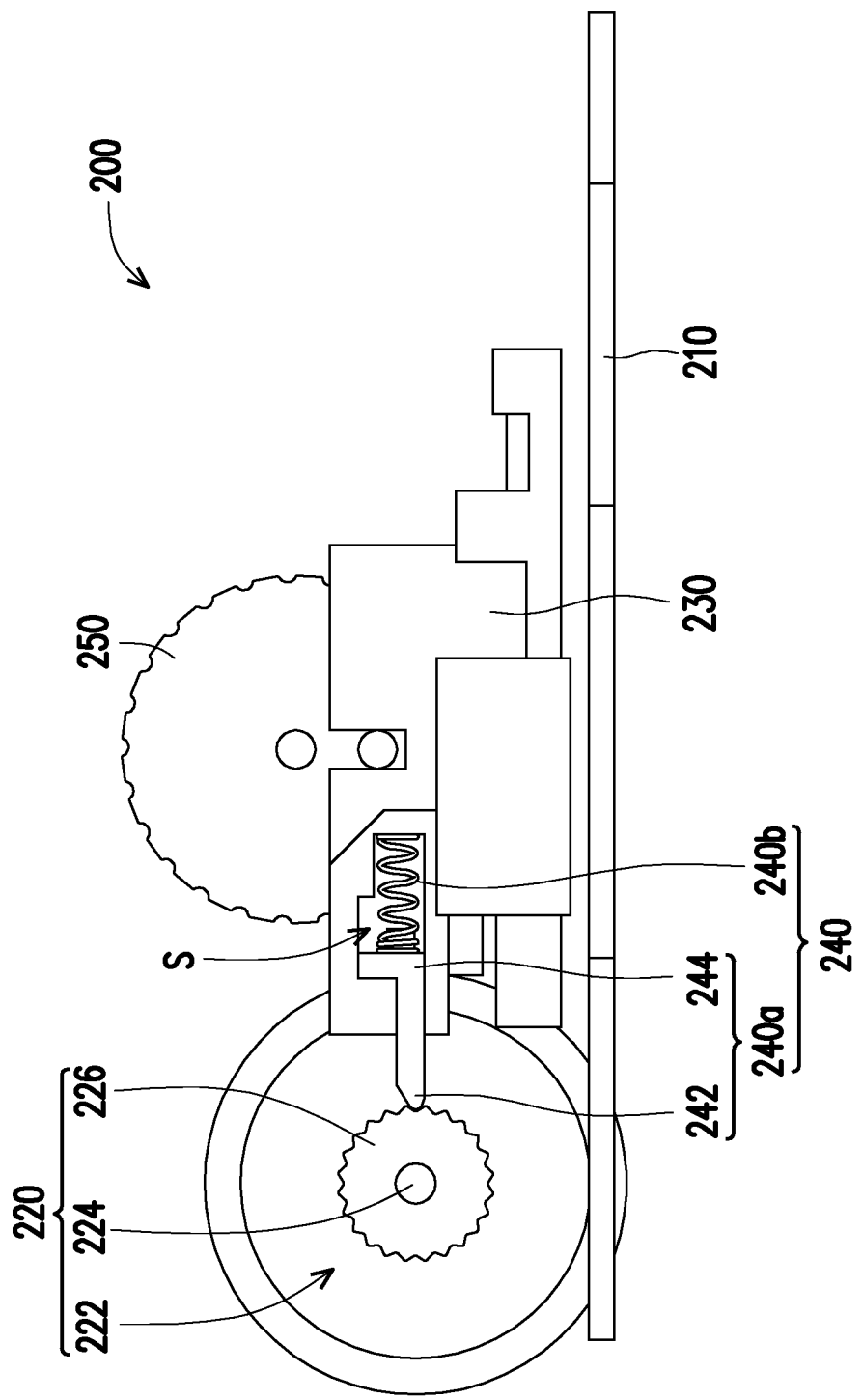
FIG. 2B is a side view of FIG. 2A.

FIG. 2A is a schematic three-dimensional diagram of an input device 200 according to Embodiment 2 of the invention, and FIG. 2B is a side view of FIG. 2A. Referring to FIG. 2A and FIG. 2B together, the input device 200 in the present embodiment is substantially the same as the input device 100 in the first embodiment, and also includes a holder 210, a first wheel 220, a slider 230, and a first pressure part 240. The first wheel 220 includes a side surface 222, a circle center 224, and a segment adjusting structure 226. The segment adjusting structure 226 is disposed on the side surface 222 in a manner of surrounding the circle center 224. The slider 230 is disposed on the holder 210, and is movable relative to the holder 210 to move toward or away from the circle center 224. The first pressure part 240 includes two first ends (a front end 242 and a rear end 244). One of the first ends (the rear end 244) is connected to the slider 230, and as the slider 230 moves toward or away from the circle center 224, interference between the other first end (the front end 242) and the segment adjusting structure 226 is increased or reduced.

In addition, in the input device 200 of the present embodiment, a second gear is also selected as a knob 250 connected to the slider 230. The setting and action manner of the knob 250 have been described in Embodiment 1. Therefore, details are not described again.

Different from Embodiment 1, the segment adjusting structure 226 in the present embodiment is a gear that is disposed on the side surface 222 of the first wheel 220, and the first pressure part 240 includes a protrusion 240a and a spring 240b.

Specifically, the slider 230 has an accommodating space S. The rear end 244 of the protrusion 240a is located in the accommodating space S. Two ends of the spring 240b respectively abut against a side wall of the accommodating space S and the rear end 244 of the protrusion 240a. Therefore, the spring 240b provides an elastic force to enable the front end 242 of the protrusion 240a to protrude outside the accommodating space S, and the front end 242 of the protrusion 240a is configured to get in contact with the teeth of the gear that is used as the segment adjusting structure 226. It should be noted that, the segment adjusting structure 226 (that is, the gear) in the present embodiment protrudes from the side surface 222 of the first wheel 220, thereby enabling the front end 242 of the protrusion 240a to forwardly abut against the teeth of the gear.

Similarly, a user may turn a second gear that is used as the knob 250 to drive the slider 230 to move toward or away from the circle center 224 of the first wheel 220 relative to the holder 210.

As the slider 230 moves toward the circle center 224 of the first wheel 220, the front end 242 of the protrusion 240a may get in contact with the teeth of the gear that is used as the segment adjusting structure 226. As the slider 230 gets closer to the circle center 224 of the first wheel 220, interference between the front end 242 of the protrusion 240a and the teeth of the gear is greater, and a compression degree of the spring 240b that abuts against an end of the protrusion 240a becomes larger. A force that is applied by the spring 240b to the protrusion 240a becomes larger, so that a force by which the front end 242 of the protrusion 240a abuts against the teeth of the gear that is used as the segment adjusting structure 226 becomes larger. Therefore, a force by which the user operates the first wheel 220 also becomes larger, so as to provide the user with different degrees of the sense of segmented movement. In addition, the protrusion 240a may alternatively be completely not in contact with the segment adjusting structure 226 (that is, the gear). Therefore, the first wheel 220 may quickly rotate.

Embodiment 3

Figure 3A:
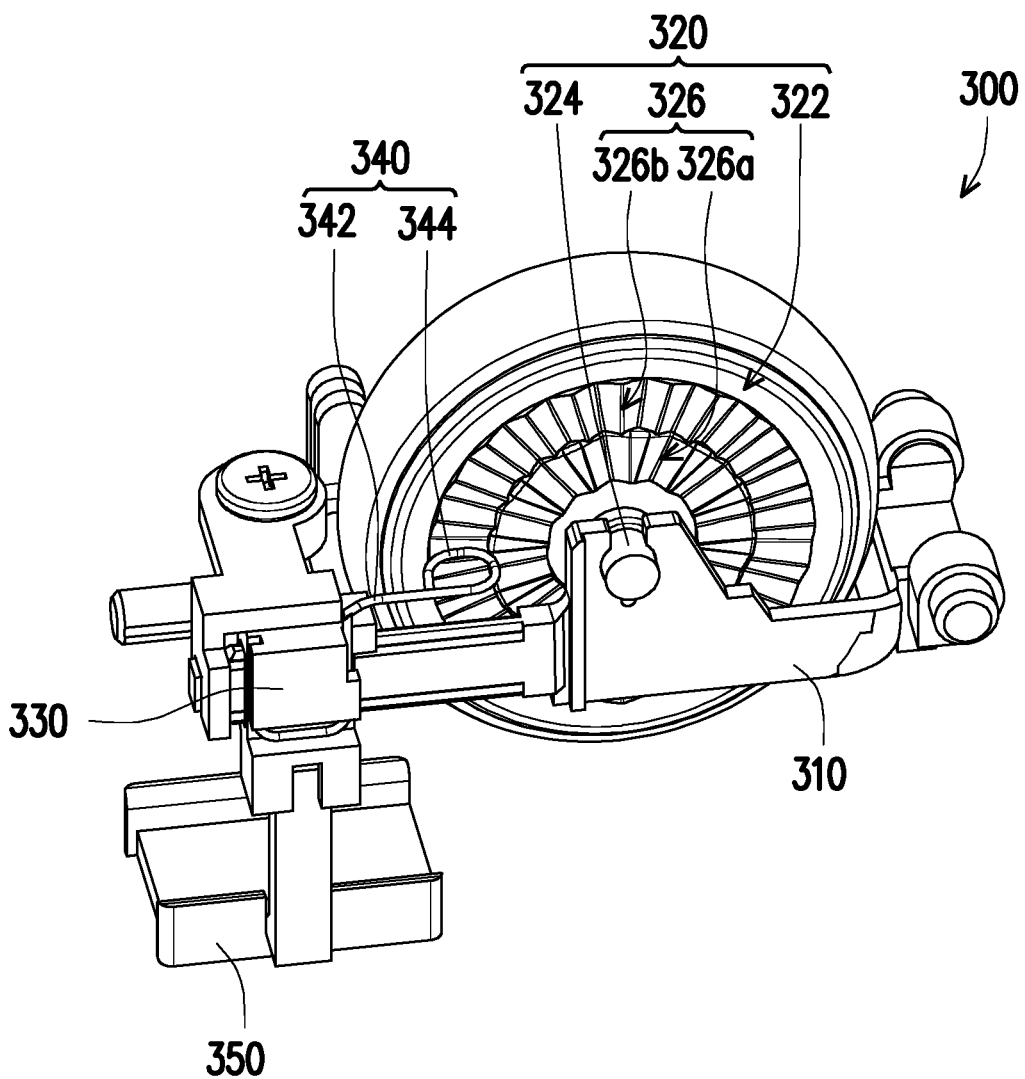
FIG. 3A is a schematic three-dimensional diagram of an input device 300 according to Embodiment 3 of the invention.
Figure 3B:
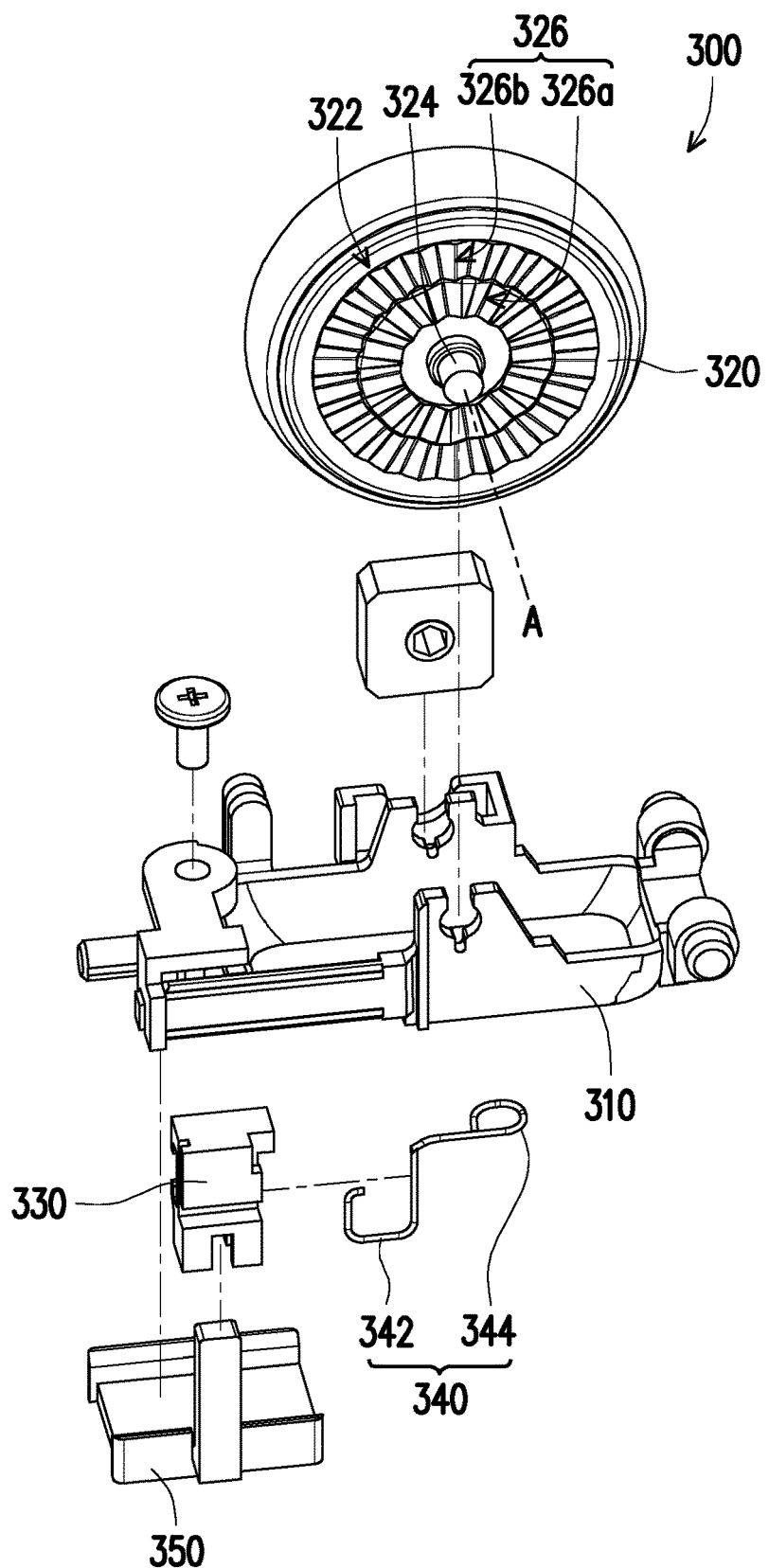
FIG. 3B is a schematic breakdown view of the input device 300 in FIG. 3A.

FIG. 3A is a schematic three-dimensional diagram of an input device 300 according to Embodiment 3 of the invention, and FIG. 3B is a schematic breakdown view of the input device 300 in FIG. 3A. Referring to FIG. 3A and FIG. 3B together, components used in the input device 300 of the present embodiment are substantially the same as components used in the input devices 100 and 200 of Embodiment 1 and Embodiment 2. However, a setting architecture of the input device 300 in the present embodiment is different from setting architectures of the input devices 100 and 200 in Embodiment 1 and Embodiment 2.

Specifically, the input device 300 in the present embodiment also includes a holder 310, a first wheel 320, a slider 330, and a first pressure part 340. The first wheel 320 is secured on the holder 310 and includes a side surface 322, a circle center 324, and a segment adjusting structure 326. The segment adjusting structure 326 is disposed on the side surface 322 in a manner of surrounding the circle center 324. The slider 330 is disposed on the holder 310, and is movable relative to the holder 310 to move toward or away from the circle center 324. The first pressure part 340 is formed by bending a metal part, and includes two first ends 342 and 344. One of the first ends 342 is connected to the slider 330. Whether the other first end 344 is in contact with the first wheel 320 depends on a location of the slider 330 relative to the circle center 324.

Different from the foregoing embodiments, the segment adjusting structure 326 in the present embodiment includes a first sub-segment structure 326a and a second sub-segment structure 326b. The first sub-segment structure 326a and the second sub-segment structure 326b are disposed around the circle center 324. The first sub-segment structure 326a is located between the circle center 324 and the second sub-segment structure 326b, and a quantity of segments of the first sub-segment structure 326a is different from a quantity of segments of the second sub-segment structure 326b.

Specifically, the first sub-segment structure 326a and the second sub-segment structure 326b include a plurality of segments protruding from the side surface 322 in an axial direction A of the first wheel 220, and shapes of the segments are substantially conical. The segments of the first sub-segment structure 326a and the segments of the second sub-segment structure 326b have similar shapes, but different sizes. Therefore, the quantity of segments of the first sub-segment structure 326a is different from the quantity of segments of the second sub-segment structure 326b.

Based on the above, in the axial direction A, heights of the segments of the first sub-segment structure 326a and the second sub-segment structure 326b are not limited, and may be the same or different. If the heights of the segments of the first sub-segment structure 326a are the same as the heights of the segments of the second sub-segment structure 326b, and widths of the segments of the first sub-segment structure 326a in a circumferential direction are greater than widths of the segments of the second sub-segment structure 326b in a circumferential direction, gradients of the segments of the first sub-segment structure 326a from bottom to top are smaller than gradients of the segments of the second sub-segment structure 326b from bottom to top.

Therefore, if the first end 344 of the first pressure part 340 that is closer to the circle center 324 of the first wheel 320 abuts against the first sub-segment structure 326a or the second sub-segment structure 326b, a scroll speed of the first wheel 320 may be affected. If the first end 344 of the first pressure part 340 abuts against the first sub-segment structure 326a or the second sub-segment structure 326b, a force that is applied by the user may be affected by the heights of the segments.

Certainly, the first end 344 of the first pressure part 340 may alternatively not abut against the first sub-segment structure 326a or the second sub-segment structure 326b.

By the way, the input device 300 further includes a knob 350. The knob 350 may be connected to the slider 330 from below the slider 330. Therefore, the knob 350 may be located below a base (not shown) of the input device 300.

Embodiment 4

Figure 4A:
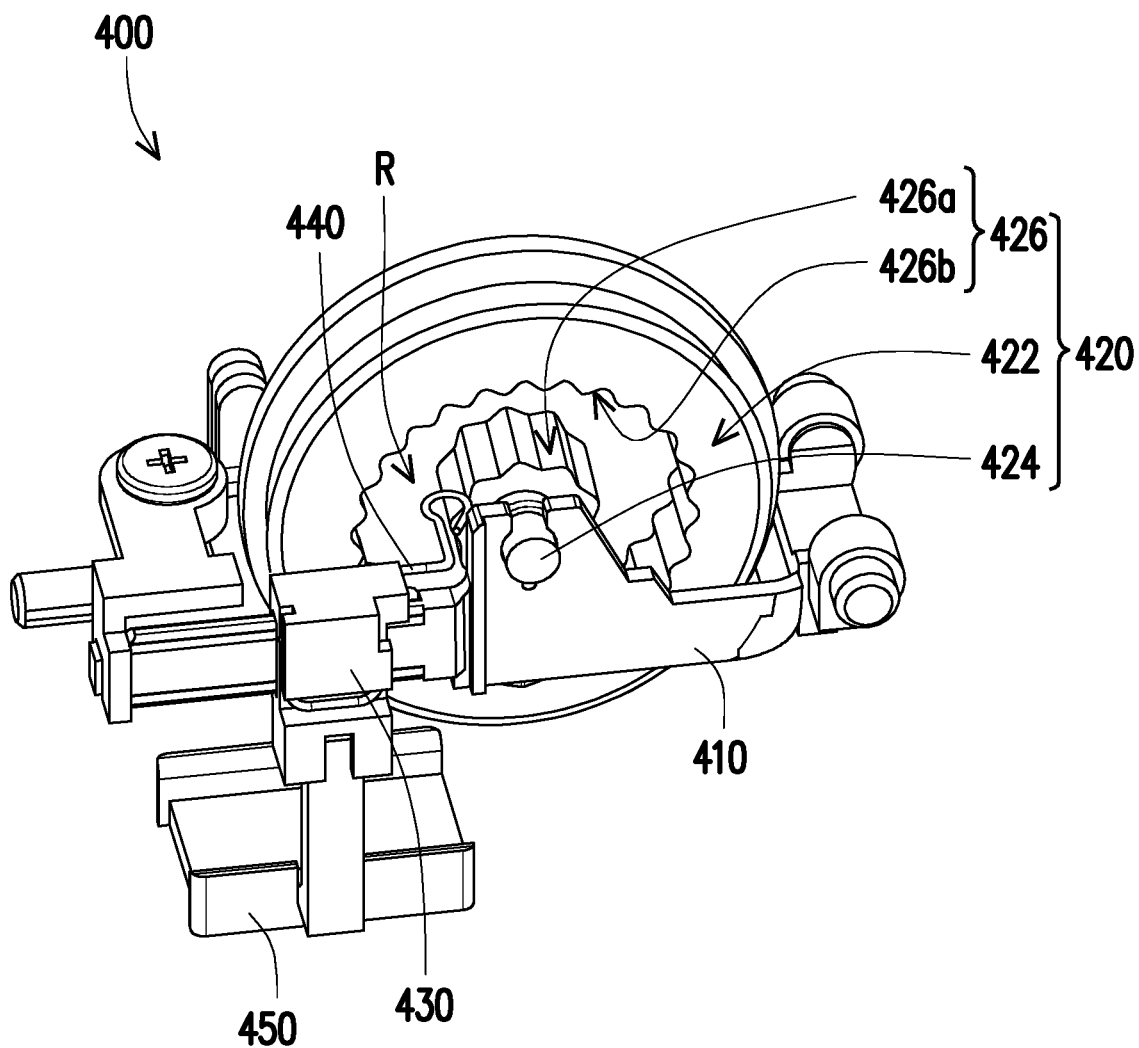
FIG. 4A is a schematic three-dimensional diagram of an input device 400 according to Embodiment 4 of the invention.
Figure 4B:
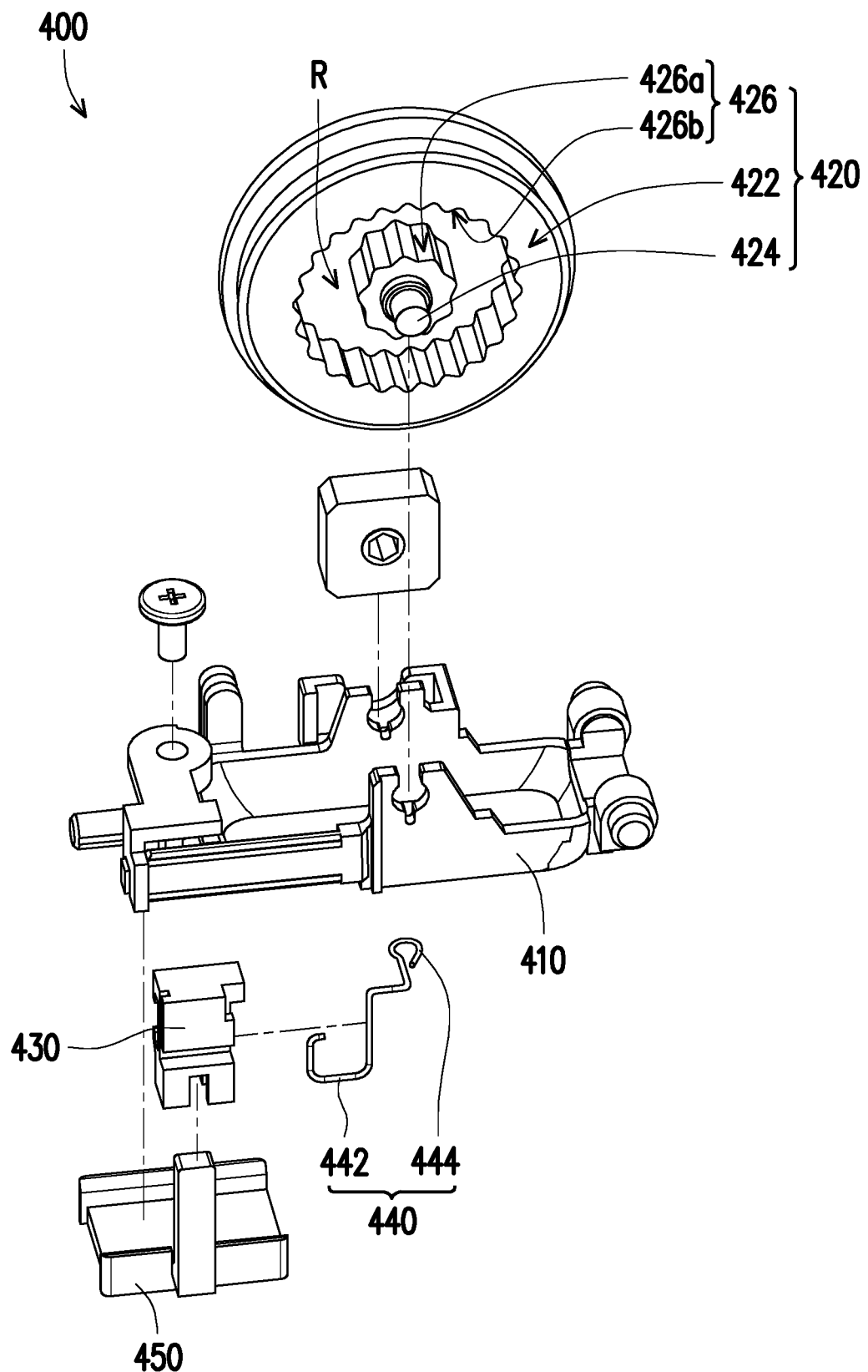
FIG. 4B is a schematic breakdown view of the input device 400 in FIG. 4A.

FIG. 4A is a schematic three-dimensional diagram of an input device 400 according to Embodiment 4 of the invention, and FIG. 4B is a schematic breakdown view of the input device 400 in FIG. 4A. Referring to FIG. 4A and FIG. 4B together, similar to the input device 300 in Embodiment 3, the input device 400 in the present embodiment includes a holder 410, a first wheel 420, a slider 430, and a first pressure part 440. The first wheel 420 includes a side surface 422, a circle center 424, and a segment adjusting structure 426. The segment adjusting structure 426 is disposed on the side surface 422 in a manner of surrounding the circle center 424. The slider 430 is disposed on the holder 410, and is movable relative to the holder 410 to move toward or away from the circle center 424. The first pressure part 440 includes two first ends 442 and 444. One of the first ends 442 is connected to the slider 430, and as the slider 430 moves toward or away from the circle center 424, interference between the other first end 444 and the segment adjusting structure 426 is increased or reduced.

Different from the foregoing embodiments, an implementation of the segment adjusting structure 426 is changed.

Specifically, in the present embodiment, a first sub-segment structure 426a and a second sub-segment structure 426b are ring gears spaced at a distance in a radial direction of the first wheel 420.

Specifically, a groove R is formed on the side surface 422 of the first wheel 420, and includes an internal ring gear that is closer to the circle center 424 and an external ring gear that is farther from the circle center 424 and located in an outer peripheral circle of the first wheel 420. The internal ring gear is the first sub-segment structure 426a, and the external ring gear is the second sub-segment structure 426b.

The internal ring gear is different from the external ring gear. Therefore, when the first end 444 of the first pressure part 440 gets in contact with the internal ring gear or the external ring gear, a force that is applied by the first pressure part 440 to the first wheel 420 differs, thereby affecting a scroll speed of the first wheel 420.

Specifically, the internal ring gear and the external ring gear include a plurality of teeth. An objective of changing a sense of segmented movement of the first wheel 420 of the input device 400 is achieved by making the teeth of the internal ring gear different from the teeth of the external ring gear.

That the teeth of the internal ring gear are different from the teeth of the external ring gear may be achieved by changing one factor selected from a tooth width, a tooth thickness, and a tooth height. Accordingly, a quantity of the teeth of the internal ring gear may be different from a quantity of the teeth of the external ring gear. For example, the internal ring gear and the external ring gear have a same tooth thickness and a same tooth height, but different tooth widths. Alternatively, the internal ring gear and the external ring gear have a same tooth width and a same tooth thickness, but different tooth heights. Alternatively, the internal ring gear and the external ring gear have same tooth widths and tooth heights, but different tooth thicknesses. This is designed according an actual requirement.

By using a difference between the internal ring gear and the external ring gear, the user enables, by moving the slider 430, the first end 444 of the first pressure part 440 that is closer to the circle center 424 to get in contact with the first sub-segment structure 426a and the second sub-segment structure 426b, or to not get in contact with the first sub-segment structure 426a and the second sub-segment structure 426b, so that the first wheel 420 of the input device 400 may have three stages of a sense of segmented movement during operation (that is, not in contact with both the first sub-segment structure 426a and the second sub-segment structure 426b, in contact with the first sub-segment structure 426a, or in contact with the second sub-segment structure 426b).

Similarly, the input device 400 may further includes a knob 450. A setting manner of the knob 450 may be the same as the knob 350 in Embodiment 3, or may be changed according to an actual requirement.

It can be learned from Embodiment 1 to Embodiment 4 that, the segment adjusting structure has a plurality of different implementations. A person skilled in the art may modify, according to actual requirements, an implementation form of the segment adjusting structure under the technical teaching provided in this specification, to achieve a same objective.

Embodiment 5

Figure 5A:
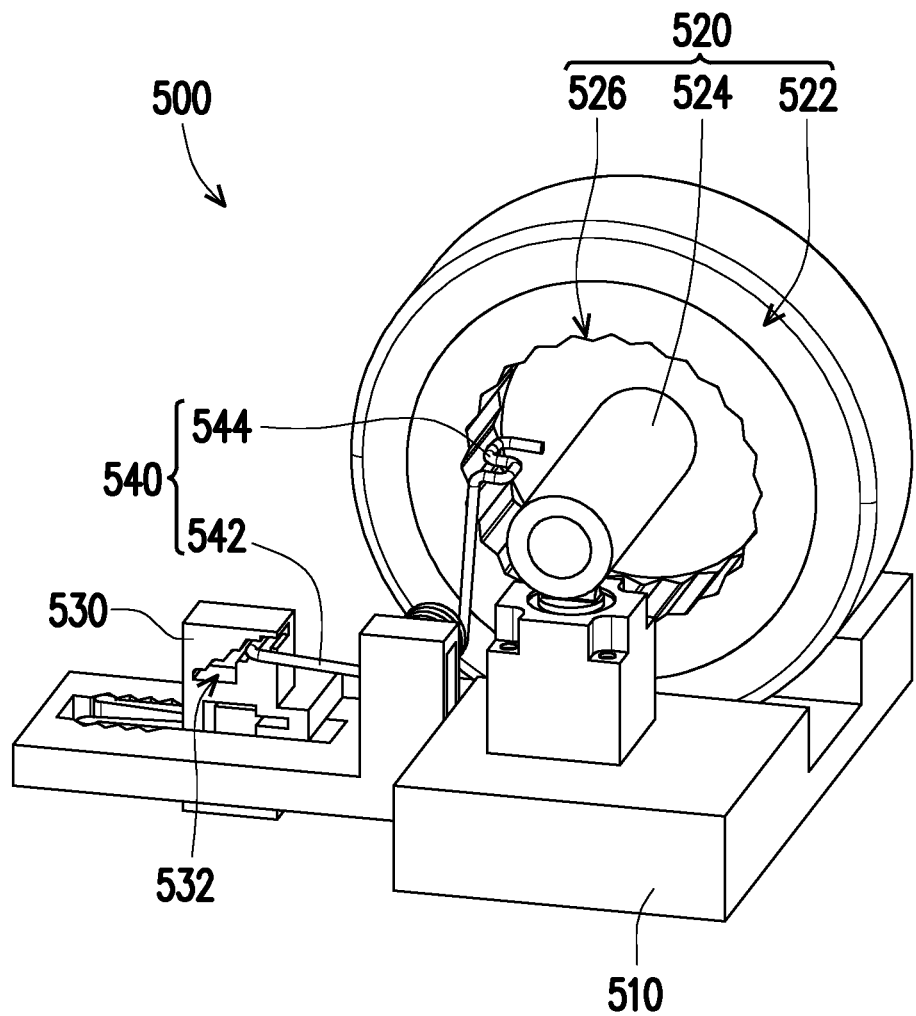
FIG. 5A is a schematic three-dimensional diagram of an input device 500 according to Embodiment 5 of the invention.
Figure 5B:
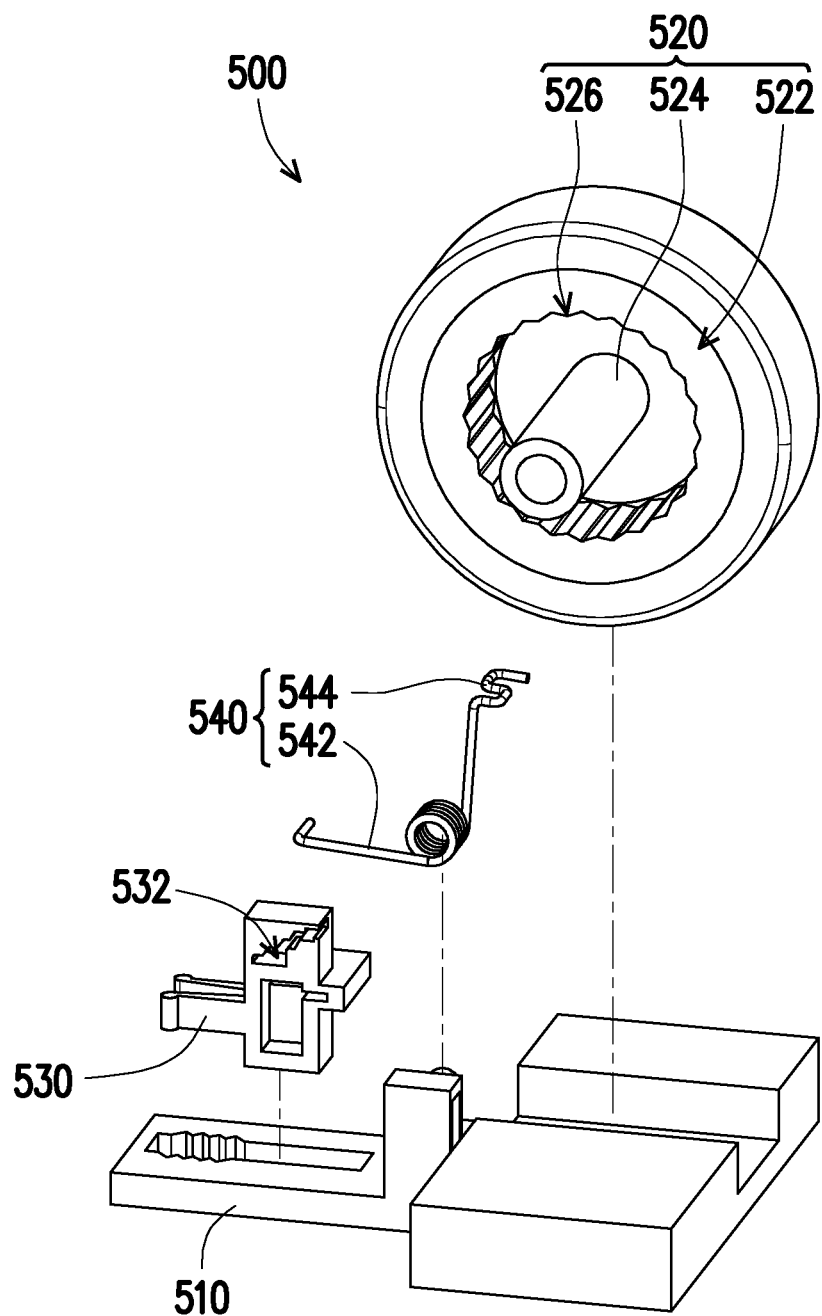
FIG. 5B is a schematic breakdown view of the input device 500 in FIG. 5A.

FIG. 5A is a schematic three-dimensional diagram of an input device 500 according to Embodiment 5 of the invention, and FIG. 5B is a schematic breakdown view of the input device 500 in FIG. 5A. Referring to FIG. 5A and FIG. 5B together, similar to the foregoing embodiments, the input device 500 in the present embodiment includes a holder 510, a first wheel 520, a slider 530, and a first pressure part 540. The first wheel 520 includes a side surface 522, a circle center 524, and a segment adjusting structure 526. The segment adjusting structure 526 is disposed on the side surface 522 in a manner of surrounding the circle center 524. The slider 530 is disposed on the holder 510, and is movable relative to the holder 510 to move toward or away from the circle center 524. The first pressure part 540 includes two first ends 542 and 544. One of the first ends 542 is connected to the slider 530, and as the slider 530 moves toward or away from the circle center 524, interference between the other first end 544 and the segment adjusting structure 526 is increased or reduced.

Different from the foregoing embodiments, Embodiment 1 to Embodiment 4 describe adjusting the scroll speed of the first wheel of the input device by using a change of the segment adjusting structure. In the present embodiment, a structure of the slider 530 is changed to affect a degree of interference between the first pressure part 540 and the segment adjusting structure 526, to adjust the scroll speed of the first wheel 520 of the input device 500.

Specifically, in the present embodiment, the segment adjusting structure 526 is a ring gear that is formed on the side surface 522 of the first wheel 520. A structure of the ring gear is similar to the external ring gear that is used as the second sub-segment structure 426b in the Embodiment 4. The first pressure part 540 is pivotally disposed on the holder 510, that is, the first pressure part 540 may rotate relative to the holder 510. More specifically, a torsion spring may be selected as the first pressure part 540. The slider 530 has a guiding structure 532. The guiding structure 532 may be a guiding groove. The first end 542 of the first pressure part 540 that is connected to the slider 530 is inserted in the guiding groove. The first end 544 of the first pressure part 540 that is closer to the circle center 524 gets in contact with the segment adjusting structure 526.

The guiding groove of the guiding structure 532 is stepped, and a step is formed upward from a bottom of the slider 530 that is farther from the circle center 524 to a direction that is closer to the circle center 524.

When the slider 530 moves toward the circle center 524 of the first wheel 520, the first end 542 inserted in the guiding groove may go deeper into the guiding groove as guided by the guiding groove, to enable the first pressure part 540 to rotate, so that a degree of interference between the first end 544 that is in contact with the segment adjusting structure 526 and the segment adjusting structure 526 is increased. In this case, a user needs to apply a larger force to scroll the first wheel 520.

On the contrary, when the slider 530 moves reversely to move away from the circle center 524 of the first wheel 520, as the first end 542 inserted in the guiding groove is guided by the guiding groove, the first pressure part 540 rotates to reduce a degree of interference between the first end 544 that is in contact with the segment adjusting structure 526 and the segment adjusting structure 526. In this case, the user may use a smaller force to scroll the first wheel 520.

Embodiment 6

Figure 6A:
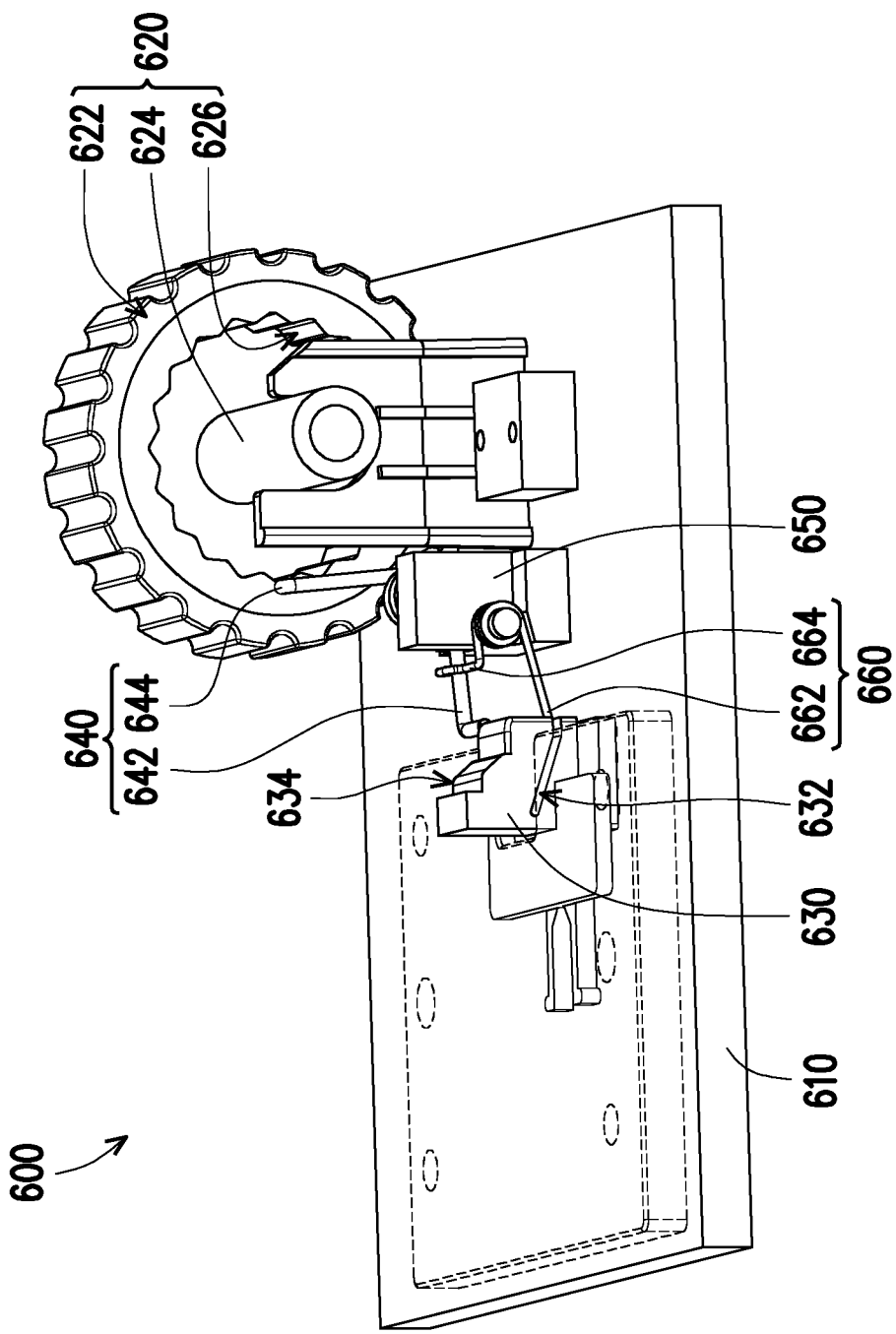
FIG. 6A is a schematic three-dimensional diagram of an input device 600 according to Embodiment 6 of the invention.
Figure 6B:
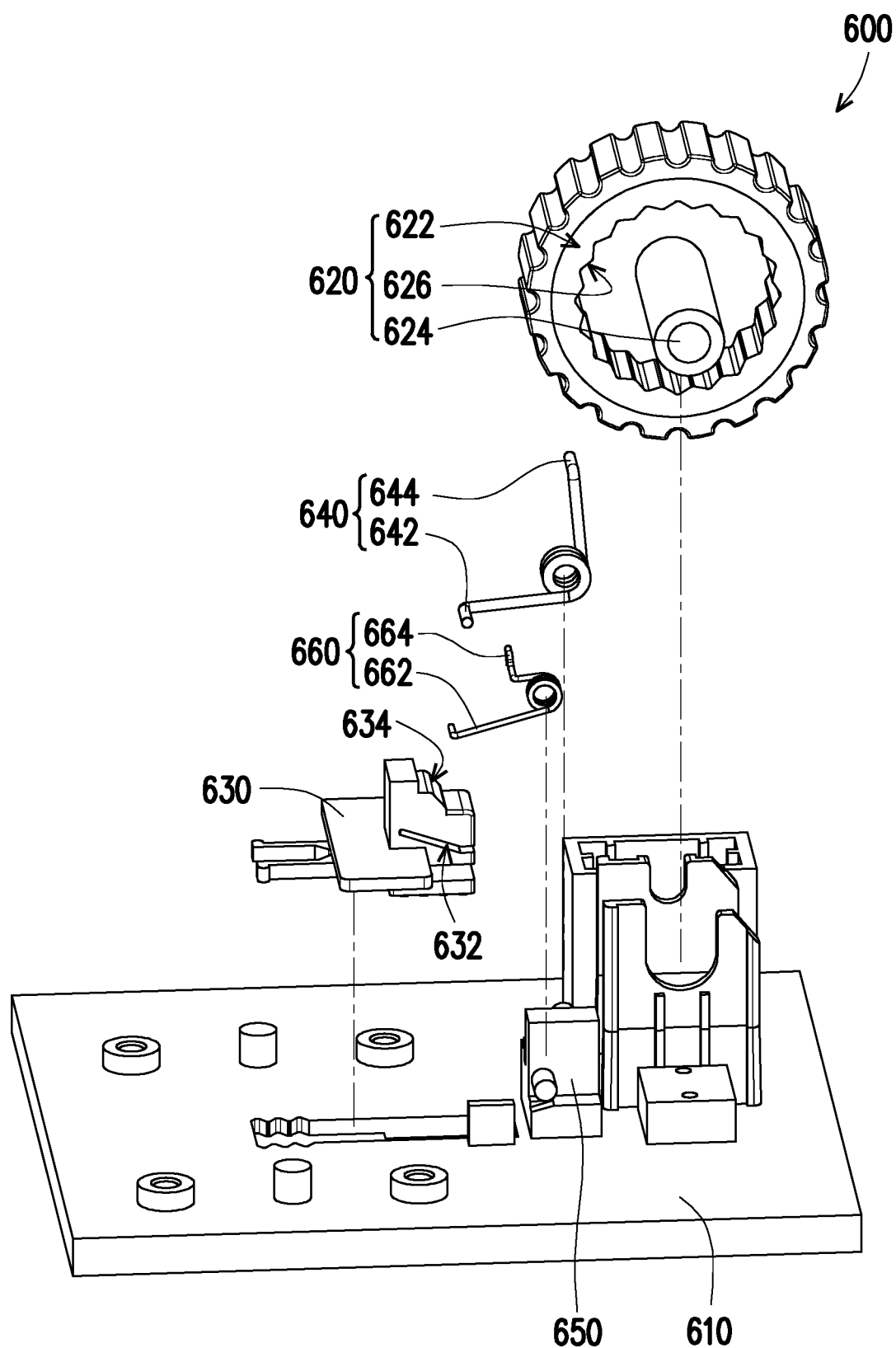
FIG. 6B is a schematic breakdown view of the input device 600 in FIG. 6A.

FIG. 6A is a schematic three-dimensional diagram of an input device 600 according to Embodiment 6 of the invention, and FIG. 6B is a schematic breakdown view of the input device 600 in FIG. 6A. Referring to FIG. 6A and FIG. 6B together, similar to the foregoing embodiments, the input device 600 in the present embodiment includes a holder 610, a first wheel 620, a slider 630, and a first pressure part 640. The first wheel 620 includes a side surface 622, a circle center 624, and a segment adjusting structure 626. The segment adjusting structure 626 is disposed on the side surface 622 in a manner of surrounding the circle center 624. The slider 630 is disposed on the holder 610, and is movable relative to the holder 610 to move toward or away from the circle center 624. The first pressure part 640 includes two first ends 642 and 644. One of the first ends 642 is connected to the slider 630, and as the slider 630 moves toward or away from the circle center 624, interference between the other first end 644 and the segment adjusting structure 626 is increased or reduced.

Different from the foregoing embodiments, the input device 600 further includes a second pressure part 660 pivotally disposed on the holder 610. The second pressure part 660 includes two second ends 662 and 664. One of the second ends 662 is inserted into the guiding groove 632 of the slider 630, and the other second end 664 of the second pressure part 660 is hooked with the first end 642 of the first pressure part 640 that is connected to the slider 630. The first pressure part 640 and the second pressure part 660 are disposed on a positioning block 650 of the holder 610. Either side of the positioning block 650 has a convex column, to enable the first pressure part 640 and the second pressure part 660 to be pivotally disposed on the positioning block 650.

The guiding groove of the slider 630 is formed obliquely downward from a side of the slider 630 that is farther from the circle center 624 toward a side that is closer to the circle center 624. In addition, the top of the slider 630 has a stepped guiding structure 634. The first end 642 of the first pressure part 640 that is connected to the slider 630 is in contact with the guiding structure 634.

When the slider 630 moves toward the circle center 624 of the first wheel 620, the first end 642 that is in contact with the guiding structure 634 may be guided by the guiding structure 634 to enable the first pressure part 640 to rotate, so that the first end 644 that is in contact with the segment adjusting structure 626 may be slightly separated from the segment adjusting structure 626.

In particular, as the second end 662 of the second pressure part 660 that is inserted in the guiding groove of the slider 630 is guided by the guiding groove 632 to enable the second pressure part 660 to rotate, the other second end 664 of the second pressure part 660, that is, the second end 664 hooked with the first end 642 of the first pressure part 640 that is in contact with the guiding structure 634, may press downward to the first end 642, so that the first end 644 that is in contact with the segment adjusting structure 626 is continuously in contact with the segment adjusting structure 626.

As the second end 662 inserted in the guiding groove 632 gets deeper into the guiding groove 632, a force applied by the second end 664 that is hooked with the first pressure part 640 to the first pressure part 640 is larger. Therefore, the degree of interference between the first end 644 and the segment adjusting structure 626 is increased.

Similarly, in the present embodiment, a knob (not shown) may alternatively be set to change a location of the slider 630.

In addition, a new implementation may be obtained by combining and changing the foregoing six embodiments according to an actual requirement. In addition, under the teachings of the foregoing embodiments, a person skilled in the art may alternatively achieve a same objective by selecting other components and by changing designs of structures or architectures.

In conclusion, in the input device in the invention, a slider, a pressure part, and a segment adjusting structure are disposed. Through cooperation of the slider, the pressure part, and the segment adjusting structure, a degree of interference between the pressure part and the segment adjusting structure may be changed by using simple actions (such as turning or scrolling), thereby further adjusting a force that the user needs to apply to a first wheel to scroll the first wheel and a scroll speed of the first wheel, so that user requirements can be satisfied.

Finally, it should be noted that the foregoing embodiments are merely used for describing the technical solutions of the invention, but are not intended to limit the invention. Although the invention is described in detail with reference to the foregoing embodiments, a person of ordinary skill in the art should understand that, modifications may still be made to the technical solutions in the foregoing embodiments, or equivalent replacements may be made to some or all of the technical features; and such modifications or replacements will not cause the essence of corresponding technical solutions to depart from the scope of the technical solutions in the embodiments of the invention.

What is claimed is:

1. An input device, comprising:
   a holder;
   a first wheel, disposed on the holder, wherein the first wheel comprises a side surface, a circle center, and a segment adjusting structure, wherein the segment adjusting structure is disposed on the side surface and comprises a first sub-segment structure and a second sub-segment structure, wherein the first sub-segment structure and the second sub-segment structure are respectively disposed around the circle center, and the first sub-segment structure is located between the circle center and the second sub-segment structure;

a slider, disposed on the holder, and being movable relative to the holder to move toward or away from the circle center; and a first pressure part, comprising two first ends, wherein one of the first ends is connected to the slider, when the slider moves toward the circle center, the other of the first ends contacts the first sub-segment structure, when the slider moves away from the circle center, the other of the first ends contacts the second sub-segment structure, wherein a portion of the first pressure part between the first ends is extended in a direction substantially parallel to an extending direction of a portion of the first sub-segment structure or the second sub-segment structure contacted by the other of the first ends.

2. The input device according to claim 1, wherein a quantity of segments of the first sub-segment structure is different from a quantity of segments of the second sub-segment structure.

3. The input device according to claim 2, wherein the first sub-segment structure and the second sub-segment structure comprise a plurality of segments protruding from the side surface in an axial direction of the first wheel, and the segments are in a conical shape.

4. The input device according to claim 1, wherein the first pressure part is a spring plate or a torsion spring.

5. The input device according to claim 1, wherein the first sub-segment structure and the second sub-segment structure comprise a plurality of segments protruding from the side surface in an axial direction of the first wheel, each of the segments has a top surface away from the side surface and a bottom surface contacting the side surface, the top surface is smaller than the bottom surface.

6. The input device according to claim 5, wherein each of the segments further has an inclined surface between the top surface and the bottom surface, a gradient of the inclined surface of each of the segments of the first sub-segment structure is smaller than a gradient of the inclined surface of each of the segments of the second sub-segment structure.

7. The input device according to claim 1, wherein the first end contacting the first sub-segment structure or the second sub-segment structure is formed as a curved rod.

8. The input device according to claim 1, wherein a movement direction of the slider is substantially perpendicular to an axial direction of the first wheel.

9. The input device according to claim 1, wherein the first sub-segment structure and the second sub-segment structure are ring gears spaced at a distance in a radial direction of the first wheel.

10. An input device, comprising:

a holder;

a first wheel, disposed on the holder, wherein the first wheel comprises a outer surface, a side surface, a center, and a segment adjusting structure, wherein the side surface is connected to and surrounded by the outer surface, the segment adjusting structure is disposed on the side surface and comprises a first sub-segment structure and a second sub-segment structure respectively disposed around the center, and the first sub-segment structure is located between the center and the second sub-segment structure;

a slider, disposed on the holder at a position corresponding to the outer surface of the first wheel; and a first pressure part, comprising a first side coupled to the slider and a second side opposite to the first side, when the slider moves toward the center, the second side contacts the first sub-segment structure, when the slider moves away from the center, the second side contacts the second sub-segment structure.

11. The input device according to claim 10, wherein the slider faces towards the outer surface of the first wheel, and is movable in a direction substantially perpendicular to an axial direction of the first wheel.

12. The input device according to claim 10, wherein a quantity of segments of the first sub-segment structure is different from a quantity of segments of the second sub-segment structure.

13. The input device according to claim 10, wherein the first pressure part connected to the slider is extended from the outer surface towards the first sub-segment structure of the first wheel, and the second side of the first pressure part comprises a bent metal bar contacting the first sub-segment structure or the second sub-segment structure.

14. The input device according to claim 10, wherein a projection of the slider projected onto a plane where the side surface exists is out of the side surface.

* * * * *